(12) United States Patent
Clough et al.

(10) Patent No.: US 6,681,828 B1
(45) Date of Patent: Jan. 27, 2004

(54) METHOD AND APPARATUS FOR SEPARATING IMAGE-BEARING MEDIA

(75) Inventors: Arthur H. Clough, Hardwick, MA (US); Walter P. Haimberger, Topsfield, MA (US); Alfredo G. Knaizzeh, West Newton, MA (US); William E. Swan, Boston, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 08/976,867

(22) Filed: Nov. 24, 1997

Related U.S. Application Data

(63) Continuation of application No. 08/576,492, filed on Dec. 21, 1995, now abandoned.

(51) Int. Cl.[7] .......................... B32B 31/16; B65H 3/32; G03C 11/12
(52) U.S. Cl. ................. 156/584; 156/540; 156/580; 156/344; 156/230; 156/247; 271/113; 271/281; 271/285; 430/253; 430/256
(58) Field of Search .................................. 156/344, 584, 156/267, 487, 488, 230, 234, 238, 247, 289, 272.2, 540, 580, 581, 582, 583.1, 583.3; 271/113, 280, 281, 285; 430/253, 256; 83/101, 139

(56) References Cited

U.S. PATENT DOCUMENTS

| 4,448,516 A | * | 5/1984 | Arney et al. ................... 355/27 |
| 5,520,776 A | * | 5/1996 | Van Allen et al. .......... 156/584 |
| 5,785,795 A | * | 7/1998 | Ryan et al. .................. 156/344 |

* cited by examiner

Primary Examiner—J. A. Lorengo

(57) ABSTRACT

Method and apparatus for peeling a carrier web having a protective layer from a keeper sheet of image-bearing medium. The carrier web and the protective layer are peeled about a peel member as the keeper sheet moves over and is deformed by a constraining roller located at or downstream of the peel member putting the protective layer in tension. Preferably, at least one of the peel member or the constraining roller has a compliant material covering to facilitate separation of unused portions of the protective layer from edges of the keeper.

9 Claims, 5 Drawing Sheets

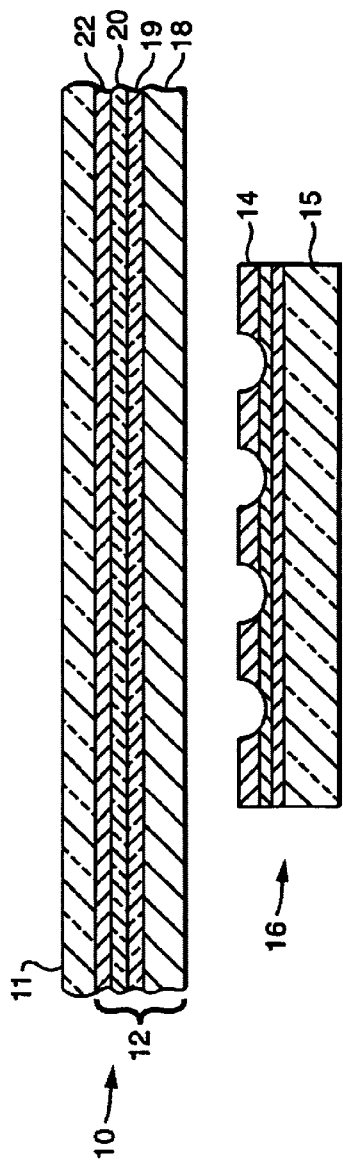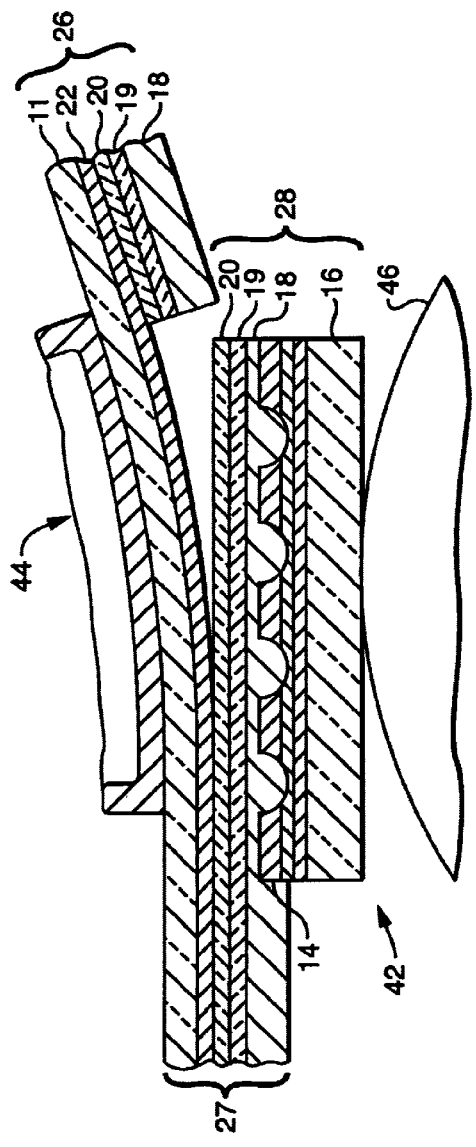

METHOD AND APPARATUS FOR SEPARATING IMAGE-BEARING MEDIA

This application is a Continuation of application Ser. No. 08/576,492, filed Dec. 21, 1995 now abandoned.

BACKGROUND OF THE INVENTION

The present invention generally relates to separating method and apparatus and, in particular, to methods and apparatus for minimizing fringing of a protective layer when separated from an image-bearing medium.

Recent developments in the image forming arts use thermal imaging laminates for achieving high quality, high resolution images, such as for graphic arts and radiological images. Examples of such medium are described in commonly-assigned International Patent Application No. PCT/US 87/03249 published Jun. 16, 1988, under International Publication No. WO 88/04327; and U.S. Pat. No. 5,200,297. The medium is a laminate in which an image forming layer thereof is a porous or particulate imaging material, preferably, a layer of carbon black that is deposited on a heat-activatable image-forming surface of a first sheet-like element. The image forming layer has an adhesive strength to a first sheet-like element of the laminate that is a function of its exposed state. The first sheet-like element carrying the imaging material is covered with a second sheet-like element that is laminated to the first so that the imaging material is confined between the first and second sheets.

This medium can be imagewise exposed as by laser scanning, whereby exposed portions of the imaging material are firmly attached to the first sheet, and unexposed portions of the imaging material are firmly attached to the second sheet. The result is a first image surface which comprises exposed portions of an image-forming substance that is more firmly attached to the first sheet and a complementary second image surface which comprises non-exposed portions of the image-forming substance carried or transferred thereto.

After imaging in the manner noted, the sheets are then peeled, separated or delaminated with the first or image-bearing sheet carrying exposed imaging material portions, and the second element carrying unexposed portions. As a result of the peeling, a pair of complementary or binary image layers is obtained, either one of which may for reasons of informational content be considered the principal image area. Such image forming materials and processes are capable of producing extremely high quality and high resolution images.

However, there are possibilities for damaging the image layer by physical contact, physical elements or the like. Therefore, it is desirable to protect the image forming layer. One known approach is through the application of a protective overcoating material, e.g., a thin, transparent, but durable/protective layer, such as described in International Patent Application No. PCT/US91/08345 (Publication No. WO 92/09930) (Fehervari et al.); and pending U.S. application Ser. No. 08/065345 (Bloom et al.). Lamination of protective overcoats, such as those described in the cited patent applications, have been accomplished by using a continuous roll, i.e. carrier web, to transfer the durable protective layer to the image carrying sheets. Activation energy is necessary for fusing the durable layer to the imaged sheet at a nip formed by and between a pair of compression rollers.

While such laminating approaches for protecting the image-bearing media are successful, nevertheless possibilities exist that during this process artifacts, such as edge fringing, might occur adjacent to punch holes formed in the laminated image-bearing medium; as well as leading and trailing edges of such medium. Fringing is considered to be stringy fragments of the protective layer which are not completely removed from the edges, such as punch holes in the image-bearing sheet during separation of the carrier from the keeper sheet. In addition, such fragments if they become separated from the image-bearing sheet and/or the carrier web may fall onto other image-bearing media so as to cause artifacts on these other sheets.

Accordingly, there is a continuing desire for improving upon efforts for enhancing the protection of the image-bearing sheet by reducing the formation of undesirable fringing of the protective layer in punch holes formed in the image-bearing sheet which might adversely affect image quality.

SUMMARY OF THE INVENTION

In accordance with the present invention there are provided improved methods and apparatus for minimizing the problems noted above in separating a carrier web having a protective layer thereon from a keeper sheet of image-bearing media. In this regard, provision is made for a method of separating unused portions of a protective layer from and adjacent edges of a keeper sheet of image-bearing medium comprising the steps of: directing the medium through a nip between a peel means and a constraining means, peeling the carrier web and the unused protective layer about the peel means and away from and off the keeper sheet as the keeper sheet advances downstream over the constraining means, and applying tension to the protective layer bearing surface adjacent the edges of the keeper sheet at or downstream of the peel means.

In an illustrated embodiment, the method is achieved by having the constraining means induce a bending of at least a cantilevered portion of the protective layer on the keeper sheet downstream of the peel means to thereby induce the tensioning of portions of the protective layer bearing surface adjacent the edges of the keeper sheet.

In another illustrated embodiment the method includes the step of using a compliant surface on at least one of the constraining means or peel means at the nip. Further in this connection, there is provided a constraining member whose surface portions are made from a compliant material. Still further, the peeling means includes a peeling surface with a compliant material thereon for engaging the carrier web.

In still another illustrated embodiment, the method includes applying tension to the keeper sheet at or downstream of the peel means in an amount which forces an unused portion of the protective layer adjacent to any edge of the keeper to be moved off of and away from the keeper sheet, and which further does not remove such protective layer portions from the carrier web.

In an embodiment, there is provided an apparatus for separating a carrier web having a protective layer from a keeper sheet of image-bearing medium. The apparatus comprises in combination, a first means and peeling means which are operable for forming a nip therebetween for receiving a sheet of image-bearing medium. The peeling means has a peeling surface about which the carrier web and unused portions of the protective layer are peeled off the keeper sheet, and a second mechanism or means being operable for inducing tension in the protective layer at or downstream of the nip for separating the protective layer from edges of the keeper sheet.

In another illustrated embodiment, provision is made for apparatus for separating an image bearing medium from a carrier web and a protective layer thereon. The apparatus, comprises in combination, a constraining means and peeling means which are operable for forming a nip therebetween for receiving a sheet of image-bearing medium. The peeling means has a peeling surface about which the carrier web and unused protective layer are peeled off the keeper sheet. The constraining means bends the keeper sheet and the protective layer so as to place the protective layer bearing surface in tension at or downstream of the peeling surface for insuring clean separation of the unused protective layer from the keeper sheet particularly at the edges.

In other illustrated embodiments, provision is made for compliant material being on at least one of the peeling means or constraining means in the nip. In one example, the peeling means includes a surface having a compliant material engageable with the protective layer. While in another example, the compliant material is on the constraining means for engaging the keeper sheet.

In yet another illustrated embodiment, the apparatus includes a deflector roll located downstream of the constraining means for engaging and deflecting the keeper sheet.

An object of the present invention is to provide novel methods and apparatus for separating appropriate or unused portions of the protective layer from a keeper sheet of image-bearing medium to obtain complete removal of the unused portions of the protective layer from the edges of the keeper sheet. Included herein are the provisions of such methods and apparatus which may be applied to any of the edges of the image-bearing medium to avoid the problems of fringing at such edges as the unused portions of the protective layer at the edges are removed from the keeper sheet. These edges include exterior edges, such as leading and trailing edges as well as internal edges, such as edges which define a punch hole or the like. In this regard, the carrier web and the unused portions of the protective layer are pulled or peeled off and away from the keeper sheet at its edges.

Another object of the present invention is to provide an improved image-bearing medium or keeper sheet produced through an improved process and apparatus which substantially reduces, if not avoids the problem of fringing of the unused portions of the protective layer from edges on the keeper.

Another object is to insure that the unused protective layer material which is separated from the keeper sheet edges remains with the separated carrier web for waste removal purposes.

BRIEF DESCRIPTION OF THE DRAWINGS

Other objects and advantages of the present invention will become apparent from the following detailed description taken in conjunction with the attached drawings in which:

FIG. 1 is a diagrammatic view of an image-bearing medium and a protective coating material;

FIG. 2 is a diagrammatic view of a separating step of the present invention;

DETAILED DESCRIPTION

Figure 3:
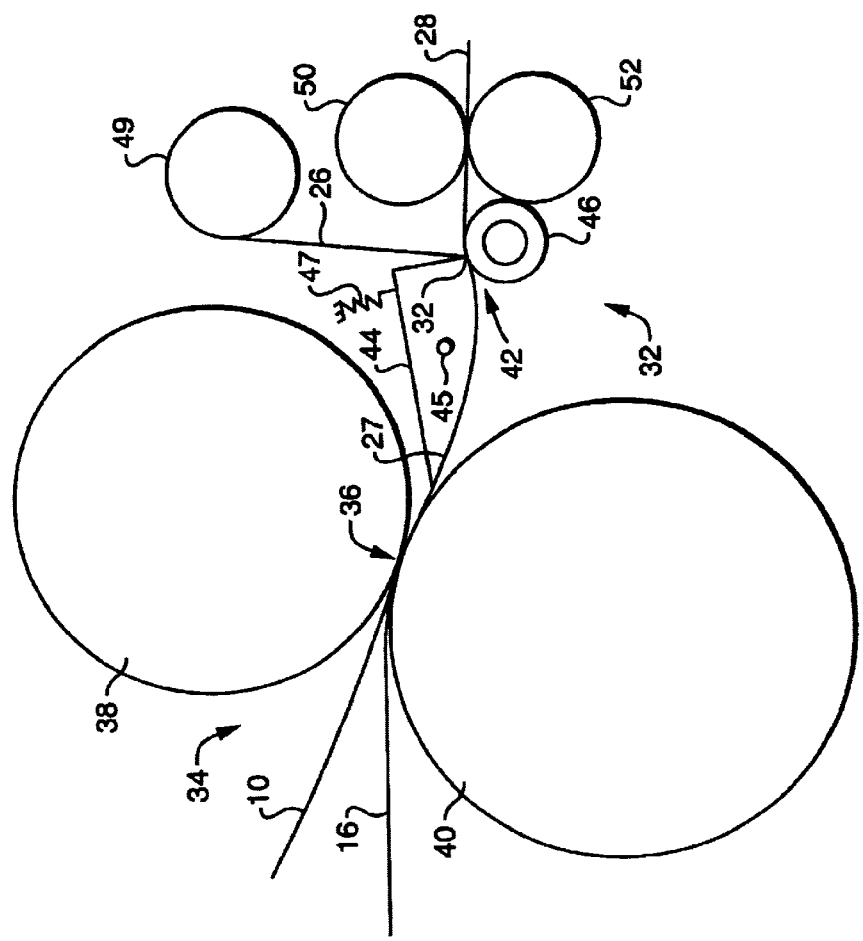
FIG. 3 is a diagrammatic side elevational view of the apparatus constituting one preferred embodiment of the present invention for carrying out the method of the present invention.
Figure 4:
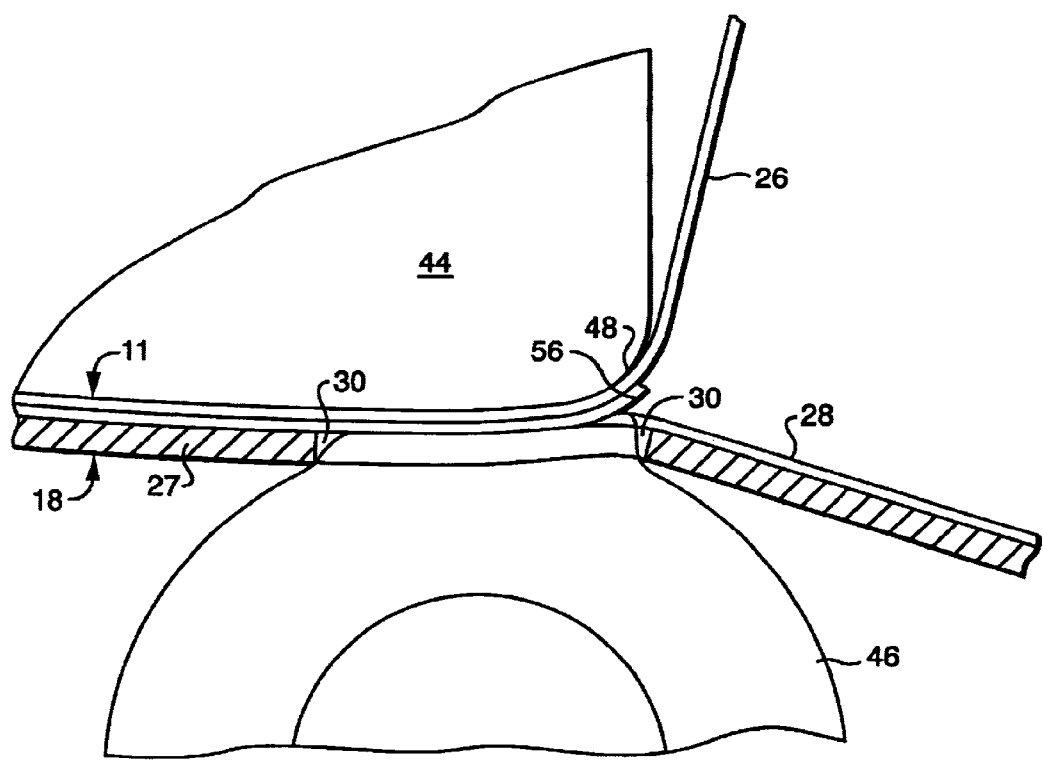
FIG. 4 is an enlarged and fragmented diagrammatic view of a portion of the separating process of the embodiment illustrated in FIG, 3.

The drawings relate broadly to apparatus for separating layered sheet articles. Initially referring to FIG. 3, there is shown apparatus for separating appropriate or unused portions of a a protective laminating sheet 10 from an image-bearing medium 16 in accordance with the present invention.

In one preferred embodiment, as illustrated in FIGS. 1–4, there is provided the laminating sheet 10 comprising a carrier web 11 and in juxtaposed relationship thereto a protective overcoating material 12. The overcoating 12 is adapted to be laminated onto an image forming or bearing layer 14 carried on a substrate 15 of the image-bearing sheet or medium 16 for purposes of protecting the latter. The web 11 and its integral protective coating material 12 form a laminating sheet which can be like that described in the patent application PCT/US91/08345; which is incorporated herein by reference as a part hereof. Only those features of the web which are necessary for understanding the present invention will be set forth. Moreover, while the present embodiment discloses one type of thermal transfer overcoating composition, it is within the spirit and scope of the present invention to include other laminating materials consistent with the use thereof as an overcoat used in protecting the image-bearing material.

Essentially, the web 11 forms a support layer for the overcoating materials 12 which overcoating materials comprise an exterior adhesive layer 18, a barrier layer 19, an intermediate durable layer 20, and a release layer 22. The protective overcoat, i.e. a thermal transfer overcoat, is thermally bonded to the image bearing medium 16 including the image bearing layer 14 in a laminating process to be described. However, in practice, the unused protective layer adjacent the edges does not cleanly separate from the edges of the keeper sheet, so that upon separation of the carrier web and the protective layer from the keeper sheet some of the unused protective layer remains on the keeper sheet in the form of fringing.

In the illustrated embodiment, the image carrying or bearing medium referred to as a keeper includes an image bearing layer 14 which is made of, for example, carbon particles formed on a transparent substrate layer 15 made of, for example, polyester. It will be understood that the image forming medium 16 has had another polyester layer (not shown) and complementary layer (not shown) of carbon particles removed therefrom, the removed particles and layer are referred to as a throwaway layer. In the illustrated embodiments, the thickness of the keeper or image forming medium 16 and the noted throwaway layer can be about 0.5 to 10 mil, and 0.5 to 7 mil; respectively. For a more detailed description of this type of thermal imaging medium, reference is made to the aforementioned International Patent Application No. PCT/US87/03249 (Etzel) which is incorporated herein by reference. Examples and methods of obtaining an image carrying medium 16 may be had from the description in U.S. Pat. No. 5,155,003; and, U.S. Pat. No. 5,200,297; which descriptions are incorporated herein by reference.

While these examples all relate to imaging media wherein the image forming or bearing surfaces are porous or the particulate image bearing surfaces are developed by laminar separation, use of the present invention is not limited to developed thermal imaging media, but rather, can also be used advantageously for the protection of images prepared by resort to other known imaging methods including, but not limited to, those prepared by thermal dye transfer, ink jet, and laser ablation transfer methods.

Reference is made back again to the laminating sheet 10, which in this embodiment is in the form of a continuous web having a width generally wider than the image bearing or carrying medium 16 for ensuring complete lamination coverage of the image carrying surface. The web 11 can be formed of any material, such as a filled polyester film base, which supports the thermal transfer overcoating material. Some characteristics of the web 11 are that it might not have subcoats. The web widths can vary from about 22 inches to 63 inches with roll lengths being 20,000 to 40,000 linear feet. The thickness can be about 0.92 mil, but other thickness dimensions can be used consistent with the principles of the present invention. The web 11 may be formed from any material, besides the noted polyester material, so long as it can withstand the conditions which are required to laminate the protective overcoat material 12 to the image carrying medium 16. If desired, the web 11 may be treated with a subcoat or other surface treatment, as well-known, to those skilled in the coating art, to control its surface characteristics, for example, increase or decrease the adhesion of the protective layer 12 to the web 11. The web 11 should be sufficiently coherent and adherent to the protective layer to permit displacement of both the web 11 and part of the protective, away from the protected laminated image carrying medium to insure removal of those portions of the protective layer of laminating sheet 10 which are at any of the edges of the medium 16. As used in the specification and claims of this application, the term edges of the keeper sheet 16 includes both external edges, such as leading and trailing edges, as well as internal edges; such edges which define the hole sites 30.

With reference to the thermal overcoat material, the durable layer 20 may be formed from any material (such as a cured acrylic polymer or a polymethacrylate) which confers the desired properties for protecting the image. For example, the aforenoted International Patent Application No. PCT/US91/08345 describes an embodiment wherein the durable layer 20 is coated as a discontinuous layer from a latex which clears during lamination to produce a clear durable layer. In general, it is preferred that the overcoating material 12, when laminated over the binary image bearing layer, not be too thick since thicker overcoating layers may, in some cases, cause problems in viewing the image due to optical effects within the overcoating material. Desirably, the thickness of the durable layer 20 does not exceed 10 micrometers, and, more desirably, this thickness is in the range of 1 to 6 micrometers. The durable layer 20 should, of course, be abrasion and chemically resistant to materials with which it is likely to come into contact, including the materials which may be used to clean the protected laminated image carrying medium. Although the exact materials which may contact the image will vary with the intended uses of the protected laminated image carrying medium, in general it is desirable that the material for the durable layer 20 should be resistant to and substantially unchanged by any materials with which it may come into contact, such as water, isopropanol and petroleum distillates. While the thermal transfer overcoat material in this embodiment is disclosed with a release layer, it will be appreciated that the a release layer, per se, is not necessary and that other overcoat materials are contemplated.

Referring back to the release layer 22, it may break unevenly so that part of the release layer having a discontinuous thickness remains with a discard or throwaway layer or sheet 26 (FIGS. 2–4) and another part of the release layer 22 remains attached to the durable layer 20 on the laminated image-bearing medium or keeper sheet 28. As noted, however, occurs at edges of the keeper sheet, such as the internal edges defined at the edges defining the punch hole sites 30 (FIG. 4) or the leading and trailing edges. Fringing in the keeper sheet is caused when the protective layer tends to adhere to and remaining with the keeper instead of going with the throwaway layer 26. It will be seen that the throwaway layer 26 will include the entire laminating web 10 when it is not laminated to the image bearing medium 16 to form the keeper sheet 28.

In the separating apparatus 32 of FIG. 3, the laminating sheet 10 is juxtaposed to the image carrying medium 16 and both are fed together at a suitable rate, such as about 1.0 inches per second to a laminating unit 34 which is described in commonly-assigned U.S. patent application Ser. No. 08/240,854 filed on May 10, 1994, and entitled "METHOD AND APPARATUS FOR PROVIDING A PROTECTIVE OVERCOAT ON AN IMAGE BEARING MEDIUM". Details of the laminating process do not, per se, form an aspect of the present invention and only those details necessary to understand the present invention are set forth. In this regard, both the sheet 10 and the image bearing medium 16 travel through a compression nip 36 formed between a heated roller assembly 38 which is about 5.0 inches in diameter and is actively heated by a heating device (hot shown), and a cold roller assembly 40 which is also approximately 5.0 inches in diameter, and is actively cooled by a cooling device (not shown). As will be noted hereinafter, the sheet 10 and the medium 16 can be prewrapped onto an angular portion of the cold roller assembly 40. The heated roller assembly 38 is preferably maintained at a temperature of about 340±5° F. and the cold roller assembly 40 is, preferably, maintained at a temperature of about 90° F. or less in order to minimize ripple and curl in the protected laminated image carrying medium; as described in greater detail in the last noted application.

As the laminating sheet 10 and the image carrying medium 16 are fed through the nip 36, a bonded image carrying medium 27 is formed due to the adhesive layer 18 softening, molding to, and adhering to the image carrying medium under a compressive force for a time sufficient to promote adhesion of it and the barrier layer, the durable layer and portions of the release layer. After passing through the nip 36, the bonded sheet and image carrying medium 16, designated jointly as the bonded image carrying medium 27 (FIG. 2) travel over a portion of the cold roller assembly and are passed to the separating apparatus 32 wherein the throwaway layer 26 is separated from the laminated keeper sheet or image-bearing medium 28.

The separating apparatus 32 includes a separating nip 42 that is defined between a member 44 termed a peel bar and a constraining roller 46 underlying the peel bar 44 which is mounted for free rotation about a shaft that has its opposite ends journalled for rotation. The peel bar 44 is preferably mounted for pivotal movement about horizontal pivot 45 and is biased towards the constraining roller 40 by a diagrammatically depicted spring mechanism 47. Alternatively, the tasks of pivoting and/or spring loading may also be applied to the constraint roller 40 instead of the peel bar. The peel bar 44 is pivotal by suitable means so as to open the separating nip 42 to allow passage therethrough of the laminating medium 10, when threading new material in preparation for use. In use, the carrier web 10 and the protective layer 12 are peeled off the keeper 28 as they move about the small radius edge surface 48 of the peel bar 44 as it is pulled under tension by a takeup mechanism (not shown) which may or may not include a wrap roller 49. At the same time the keeper 28 is driven over the constraining roller 46 and to a pair of exit rolls 50, 52.

In accordance with the present invention, the constraining roller 46 is situated so that when it forms the nip 42, it bends a portion of the keeper sheet 28 and the immediately overlaying web upwardly as viewed in the drawings. By so inducing a bending of a cantilevered portion in the keeper immediately adjacent the nip, there is formed sufficient tension in the protective layer to facilitate an enhanced fracture of the protective layer therefrom; especially about the edges, such as edges at the punch hole sites 30. Accordingly, fringing of and about the hole edges is greatly reduced or eliminated. In this embodiment, the constraining roller 46 is provided with a flexible surface 54 formed of a material having desirably a low modulus of elasticity and which is therefore compliant enough to in effect enter the punch hole sites (FIG. 4); such as foam rubber. Other compliant materials, such as silicone and polyurethane are contemplated for use. Such materials will enable surface portions such as 54 (FIG. 4) to deform and enter into the holes 30 of the keeper 28 to enhance separation of those flap portions 56 of the carrier web 11 at the hole sites. In addition, in this embodiment the deformable portions assist in gently urging the flap portion 56 upwardly so that while they are separated from the keeper sheet 28 at edges, such as the punch hole sites, they nevertheless remain with the throwaway sheet 26 and do not fall therefrom. This further assists in preventing the formation of future artifacts which might be caused by such detached flaps falling onto other image-bearing media.

Although it is preferred that the axes or center of the constraining roller 46 be vertically aligned with the peel bar edge surface 48 having a radius the axis of the roller 46 may be offset in either upstream (FIG. 4) or downstream from the peel bar radius 48. For example, the axis of the constraining roller may be offset by 1 or 2 millimeters. It will be appreciated that other dimensions are useful and the above have been given for purposes of illustration and not limitation. Tension can be applied directly to the keeper sheet with sufficient tension being applied by the exit rolls without the roller 46 inducing tension in the keeper by bending.

Figure 5:
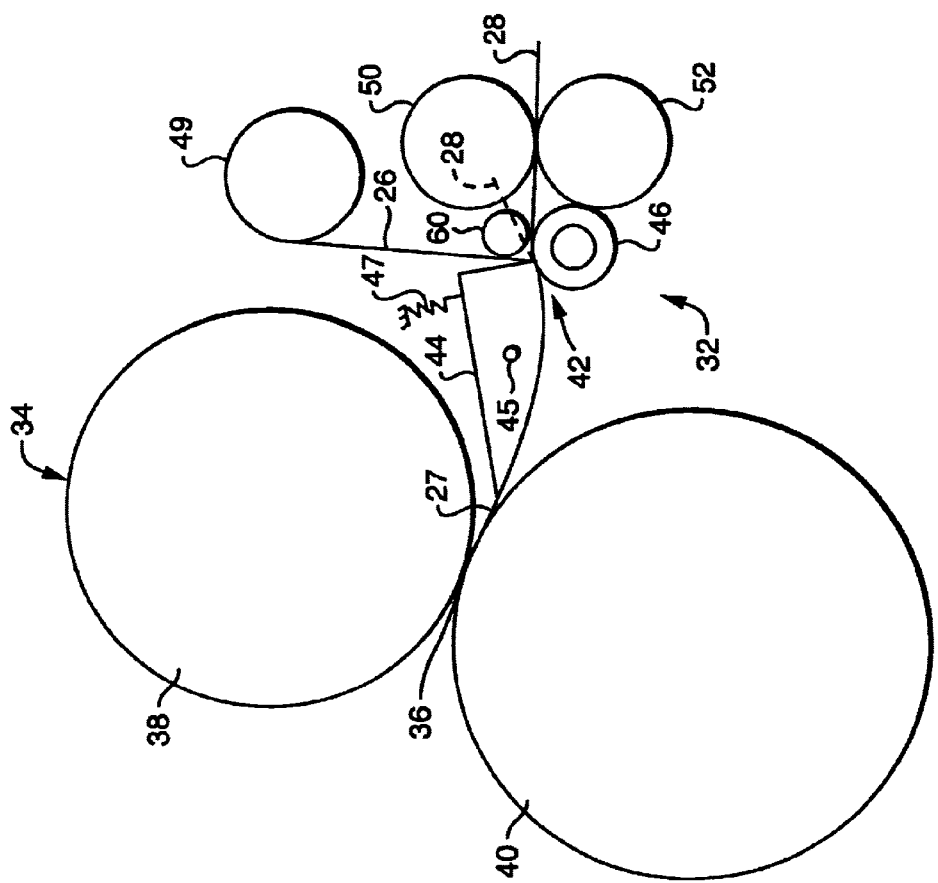
FIG. 5 illustrates another preferred embodiment of the present invention.

Reference is now made to FIG. 5 for illustrating another preferred embodiment of separating the throwaway sheet 26 from the keeper sheet 28. This embodiment utilizes a deflector roller 60 which is located downstream of the constraining roller 46. The deflector roller 60 is arranged to engage and downwardly deflect the keeper so as to assist in maintaining the keeper on the constraining roller 46.

Figure 6:
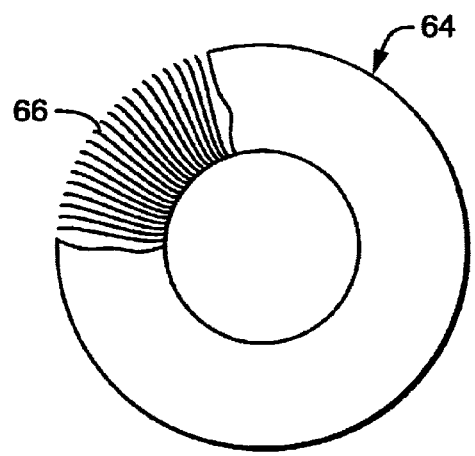
FIG. 6 illustrates still another preferred embodiment of the present invention; and, FIG. 7 illustrates yet another preferred embodiment of the present invention.

Instead of the use of a constraining roller as noted above, a constraining roller 64 as illustrated in FIG. 6 can be used which is made of a brush 66. The brush 66 is formed and located relative to the peel bar so that its flexible filaments can bend at least a cantilevered portion of the keeper 28 and the protective layer downstream of the nip and thus enable the tensioning of the protective layer to be effected; whereby the protective layer is separated from at least adjacent the internal edges of the keeper, such as at the punch holes. The filaments need not and in this embodiment do not enter within the punch holes. The brush filaments can be made of suitable materials, which preferably do not cause damage to the surface of the medium.

Figure 7:
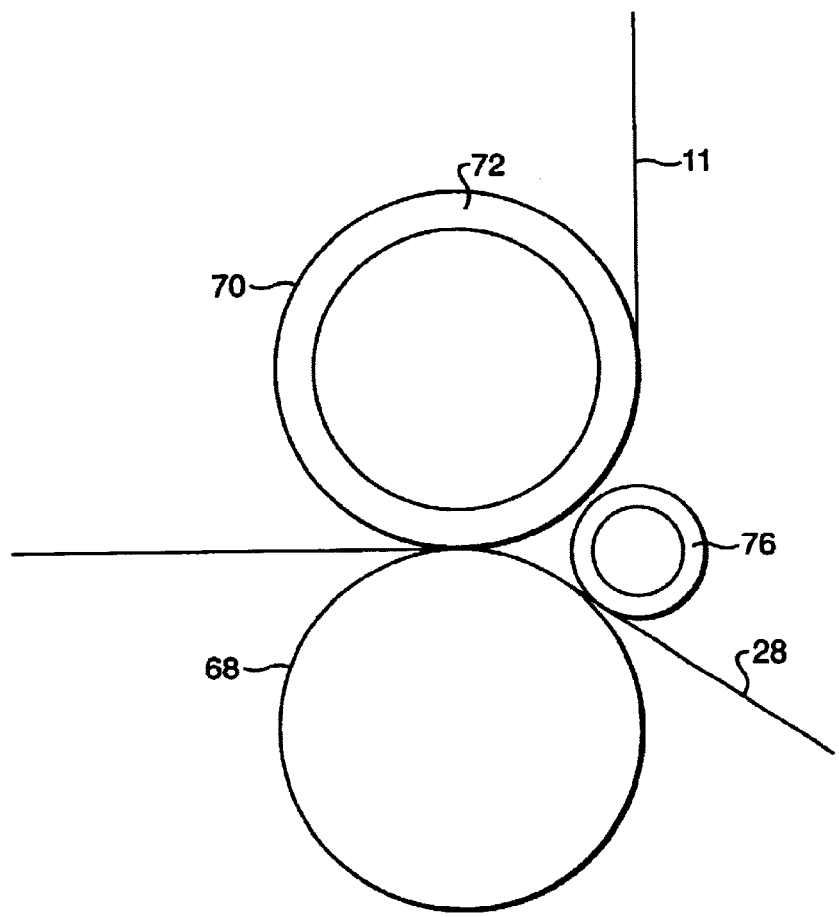

Reference is made to FIG. 7 for illustrating another embodiment, wherein instead of a peel bar the separation nip 42 is formed by a lower roller 68, preferably having a relatively stiff (e.g., steel) peripheral surface which is selectively engageable with a separation or peel roller 70 having a peripheral covering 72; such as foam rubber of the type described above. The rubber will prevent embossing of debris. The covering of the upper peel roll can have any degree of stiffness from compliant to non-compliant. The peel roller 70 preferably has a radius generally equal to or smaller than the lower roller. The upper roller will constrain the carrier web and the protective layer as it is pulled upwardly. Although not shown, the roller 68 can be arranged so that its axis of rotation is offset downstream of the axis of rotation of the separation roller 70 to bend the keeper sheet. In this embodiment, the compliant covering material engages the laminate for purposes of applying appropriate bending to the keeper and therefore the protective layer. Also in this embodiment, there is provided a deflecting roller 76 which is preferably situated close to the nip of the rollers 68 and 70. The reason is to provide constraint before the leading edge punched holes on the laminated medium enter the nip. Accordingly, the leading edge holes should not have any fringe in them. Further, placing the deflector roller in contact will assist in pushing the sheet out of the system after it has completed the peeling process. The deflection roller by being in contact with the lower roller 68 will turn and push the film out of the machine. This has the additional advantage of ideally removing the exit rolls. One working example of the foregoing arrangement includes the upper roller 70 having about a 1.25 inch diameter and the lower roller 68 having a 0.750 inch diameter. The nip pressure between the two rollers was 0.615 lb./in. The deflector roller can lie at about 45 degrees from a line connecting the centers of the main nip rollers. The diameter of the deflecting roller should be about 0.35 inches and the pressure against the lower roller should be less than 0.5 lb./in. The deflector roller assists in the formation and bending of a cantilevered portion of the keeper.

Other embodiments of the present invention will become apparent to those skilled in the art but without departing from the invention whose scope is indicated in the appended claims.

What is claimed is:

1. Apparatus for separating a carrier web having a protective layer from a keeper sheet of image-bearing medium, comprising in combination, a constraining means and peeling means which are operable for forming a nip therebetween for receiving a sheet of image-bearing medium, said peel means having a peeling surface about which the carrier web and protective layer are peeled off the keeper sheet, said constraining means includes a constraining member that bends the keeper sheet to place the protective layer surface in tension at or downstream of the peeling surface for insuring separation of unused portions of the protective layer from edges of the keeper sheet.

2. Apparatus defined in claim 1 wherein at least one of said constraining member and said peel surface includes a compliant material.

3. Apparatus defined in claim 2 wherein said constraining member is a roll having a compliant peripheral surface engageable with the keeper sheet.

4. Apparatus defined in claim 2 wherein said peeling surface has a compliant material engageable with the carrier web.

5. Apparatus defined in claim 4 wherein said peeling surface is formed on a peel roller.

6. Apparatus defined in claim 3 wherein said compliant material is foam rubber.

7. Apparatus defined in claim 3 wherein said compliant material includes a brush.

8. Apparatus defined in claim 1 wherein there is provided a deflecting means for engaging the keeper sheet downstream of the nip for further assisting in placing the protective layer in tension.

9. Apparatus defined in claim 8 wherein said deflecting means includes a roller which forces the keeper sheet into engagement with said constraining means for assisting in advancing the keeper sheet through the nip.

* * * * *